Nov. 25, 1930.   A. HERZ   1,782,875
ANTIINDUCTION SHIELD
Filed Feb. 16, 1928
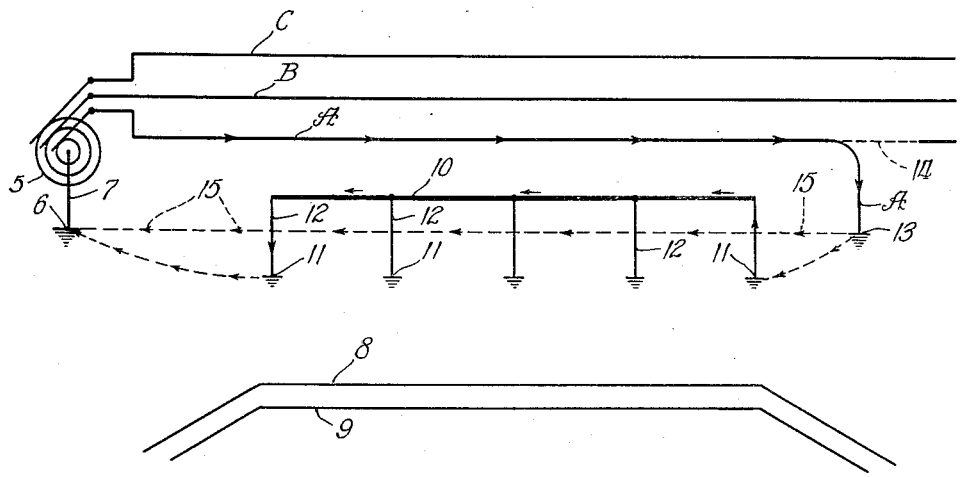
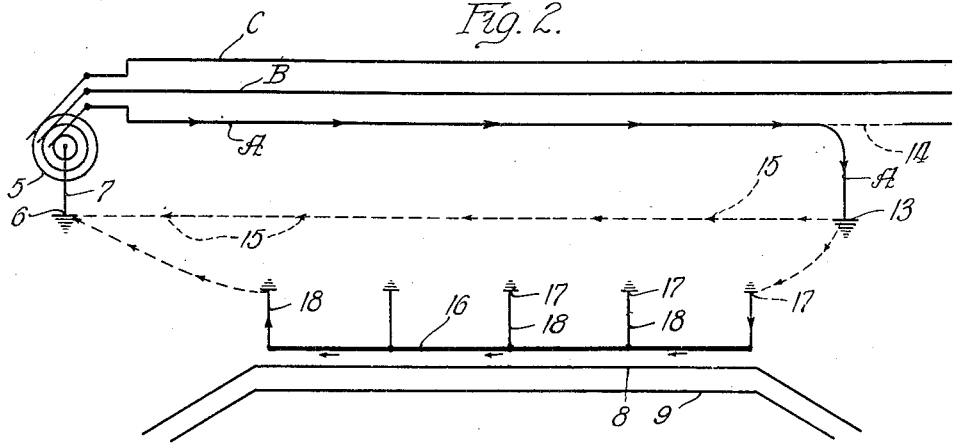
Inventor
Alfred Herz Patented Nov. 25, 1930

1,782,875

UNITED STATES PATENT OFFICE

ALFRED HERZ, OF CHICAGO, ILLINOIS

ANTI-INDUCTION SHIELD

Application filed February 16, 1928. Serial No. 254,706.

This invention relates to an anti-induction protective device which has for its purpose the protection of telephone, telegraph, and the like nonpower conducting lines which I term herein broadly as signal wires and the apparatus connected therewith which may be in the neighborhood of power lines or subject to the inductive influence of a power system.

I am aware of the fact that various methods and means have been employed to balance out the inductive effects of a power system, but the results have not been successful to the extent of eliminating inductive disturbances and it is not the object of this invention to prevent the power cycle hum in a telephone system, but my invention is, on the other hand, a safety device for preventing the induction of excessive voltages in the protected lines as will hereinafter become more apparent.

Considering for instance a three phase power system with a grounded neutral and a telephone system having a portion thereof of perhaps three or four miles, more or less paralleling the power line. The telephone apparatus and wires may be insulated to withstand a maximum of 500 volts, and any induction of a greater voltage will be dangerous and destructive.

It is possible to transpose the conductors of telephone lines and the like, but this transposition merely equalizes the inductive effect as between the two sides of the line and does not in any way reduce the inducted voltage.

If, in the case under consideration, one of the power wires becomes broken or otherwise grounded, a single phase loop of comparatively great width, depending on the height of the poles or towers and extending perhaps for miles is produced. Such a loop sends out magnetomotive forces through a considerable area and dangerously high voltages are induced in neighboring lines of communication. Under this condition transposition of the power wires or of the signal wires would be wholly ineffective. I propose to provide a conductive path in parallel with the ground return and have this conductor inductively related to the power wires to greatly neutralize the inductive effect, the power system would otherwise have on the signal wires. It is within the contemplation of my invention to employ such a conductor in immediate association with the signal wires instead of with the power wires, if found more desirable in the particular instance, or I may provide, two such conductors; one associated with the power wires and the other associated with the telephone wires, but in either case, the conductive path so provided should preferably be interposed between the power wires and the wires to be protected.

For this purpose, I provide a full power sized conductor adequately insulated from both systems of conductors and grounded at frequent intervals of say every three or five poles more or less, as may be required to give the amount of protection necessary to insure safety under all circumstances and conditions. For instance, if the protected line is insulated for 500 volts and a single phase loop, as heretofore described, produces in a given section of telephone line a voltage of 700 or 800 volts, I would so design and equip my protective conductor with the requisite number of grounds to prevent the induction of over 300 volts maximum in the protected line.

In addition to the utility of my invention as above set forth, the protective conductor will effectually operate to neutralize the resultant magnetic field of a power line caused by unbalance resulting from corona loss, or other leakage and more particularly my invention functions to protect a telephone line or the like from the influence of the resultant field which is at all times present on account of the fact that the power wires are frequently spaced many feet apart and the telephone wires are considerably nearer one of the power wires than the other. In such cases, a voltage will be directly induced in the protecting conductor and a current will flow in opposite direction to the inducing current in accordance with Lenz's law thereby producing a magnetomotive force neutralizing to a great extent the inducing field and thereby eliminating or at all times preventing the voltage induced in the protected wires from exceeding a predetermined maximum value.

In order that those skilled in the art may more thoroughly understand my invention, I have shown in the accompanying drawings a specific illustration of my invention as in actual use:

Fig. 1 is a wiring diagram of a three phase power line showing a line to be protected and a protecting conductor properly associated therewith;

Fig. 2 is a similar diagram showing a protecting conductor immediately associated with the protected line instead of with the power line; and Fig. 3 is a diagram similar to Figs. 1 and 2 and showing two protecting conductors properly associated with the power line and the protected line, respectively.

The power system may consist of a multiphase generator 5 connected to the phase wires A, B and C, the neutral being grounded at 6 by conductor 7. Telephone lines 8 and 9 are shown paralleling the power line for some distance and it is the paralleling portion, in particular, that needs to be protected so that it will not receive and transmit to other parts of the system dangerous voltages which would otherwise be induced therein. A protective or safety conductor 10 of relatively large current-carrying capacity is preferably supported on the power line poles or towers, as the case may be, and suitably insulated therefrom. This conductor of large current carrying capacity, grounded at frequent intervals, operates as a short circuited secondary winding with relation to the electromagnetic induction of the power line, and upon the occurrence of the phase to ground fault it acts as a shunt upon the ground return to conduct most of the current from said grounded power wire. At frequent intervals as at 11, the conductor 10 is grounded by wires 12, in order that it may pick up current that would otherwise return by way of the ground to the generator and create an unbalance of the magnetic field. The phase wire A is shown broken and grounded at 13, the dotted extension 14 indicating where the wire A should normally be positioned. A single phase current passes through the loop constituted by the generator 5, phase wire A to ground at 13 and back through the ground as indicated by the arrows 15 through the conductor 7 to the generator, thus completing the circuit. By the use of the protecting conductor 10, the single phase current dividing in accordance with the resistance of the two paths presented, in part enters into the ground wire 12 and traverses the conductor 10 which by its proximity to the signal wires and by the induction effect outside of the loop so formed prevents excessive disturbances on the lines 8 and 9. It is to be observed that the axis of the included magnetic effect of current flowing in the vertical loop comprising the phase conductor A and ground return 15 is horizontal, producing a maximum induction effect upon signal wires 8, 9. However, since the shield wire 10 is on the same poles as the power wire A the loop formed by said wires A and 10 is substantially horizontal and the axis of the included magnetic field is vertical and hence ineffective upon the signal wires 8, 9. But because the shield wire 10 is between wire A and the signal wires the effect of its return current flow is more pronounced upon the signal wires 8, 9 than is the remoter phase wire A, thereby reducing the effect of the induction from the current flowing in the vertical loop.

In Fig. 2 is illustrated a power system identical in every respect to that shown in Fig. 1 and the line to be protected the same as shown in Fig. 1, but the protecting conductor 16 is supported adjacent the lines 8 and 9 on the telephone poles, instead of on the power poles as heretofore described. The conductor 16 is grounded at 17 at frequent intervals by the wire 18.

The operation in this case is similar to that of the construction shown in Fig. 1 except that the action is directed to the protection of the particular section of lines with which it is associated rather than a general neutralization of the disturbing field, for the reason that relatively less of the return current is picked up and the voltage induced in the conductor 16 by the disturbing field causes a current to flow, which augmented by the returning ground current creates a counter magnetomotive force which neutralizes the disturbing field in the immediate locality of the line with which the conductor is associated and prevents the induction of excessive voltages in the protected line.

In Fig. 3 I have shown the use of a conductor 10 and a conductor 16, which cooperate in bringing about a general neutralization, and in addition, a specifically directed protection for the lines 8 and 9 where they parallel the power line.

In the transmission systems herein illustrated it will be seen that current flowing out over one metallic wire of the transmission system returns over one or more of the adjacent wires of the transmission system and the electromagnetic effects of the two flows of current tend to neutralize each other in adjacent space.

However, with respect to the communication wires which are disposed adjacent the transmission line, one of the power wires may lie nearer to the communication wires than another power wire, so that there would tend to be a residual or unbalanced magnetic influence of the current flow in said one power wire upon the communication wires. This may, under conditions approaching the ideal, be substantially neutralized by transposition of the power wires. If transposition is inadequate, or cannot be fully carried out, an unneutralized or residual field will still be present.

This condition of substantial cancellation of the magnetic fields of the power wires with respect to a communication wire will be upset by any condition such as that due to current flowing in one or more of the conductors of the power system without the mutual cancellation effect provided by the return flow of current through one or more of the conductors of the transmission system. In other words, any current flow which does not have its magnetic effect cancelled due to its own return circuit will cause a voltage to appear upon the communication line.

An example of this is a flow of current, usually termed residual current, flowing from the power conductors and finding a return path by way of a more or less distant earth connection. This residual current may be due to unbalance between the transformers in a bank, or to over-saturation of the cores of the transformers, or other causes.

Another example of unbalance would be as above recited, where one of the conductors of the transmission line is faulted. This latter condition is, of course, more severe than the so-called residual current, but it is only temporary in character, whereas the residual current may persist continuously.

There are other conditions which will cause similar effects.

The grounded shield wire such as is herein discussed does not carry current under ideal conditions, where a complete magnetic balance is secured. In practice, such an ideal condition is rarely attained, but as soon as any departure from ideal condition occurs the shield wire assumes its duty as a low resistance path for current induced by the unbalanced field, setting up by its own current flow an opposing magnetic field, tending to ameliorate the conditions under which the communication wires must operate.

I employ the term transmission system, herein, in its broadest sense.

The shielding means, consisting of either the single wires 10 or 16 shown in Figs. 1 and 2 or the two wires 10 and 16, shown in Fig. 3, provides one or more vertical loops broken up in sections by the ground taps 12—12 and 18—18, which constitute a closed coil of such low resistance that the residual unbalanced or unneutralized magnetic effects due to either the normal power current flow without transposition, or inadequate transposition, or residual current flow from unbalanced conditions within the transmission system, or ground fault current, will cause a current flow due to induced voltage great enough to reduce the effect upon the signalling conductor to a point where operation of said signalling conductor is not endangered.

Having described my invention in its preferred form, I do not intend to be limited by the specific details herein illustrated and described, but desire to avail myself of such variations and modifications as come within the scope of the appended claims.

Whereas in the specification and claims I refer to shielding telephone and the like lines I intend to include thereby such circuits or lines as inherently employ relatively weak currents for operating connected mechanisms or apparatus such, for example, as telegraph lines, wires used in remote control of other apparatus, supervisory circuits, relay circuits, television, or picture transmission circuits and the like. Such lines or circuits operating inherently on small currents would be materially disturbed by extraneous fields caused by power wires in normal or abnormal condition.

I claim:

1. A system of the class described, comprising in combination an A. C. power transmitting line comprising aerial conductors insulated from ground except through a grounded neutral connection, an insulated signaling conductor paralleling the power line for a sufficient distance that when it is subjected to the inductive effect of current flow in the power line a potential will tend to be induced upon said signaling conductor in excess of the insulation value of said signaling conductor, a shielding wire of substantially the conductivity of the aerial conductors of the power line interposed between the power line and the signaling conductor, and a series of highly conductive grounded taps connected to said shielding wire, said shielding wire being of sufficient capacity to conduct therethrough the return flow of current in case of a ground fault of one of the conductors of the transmission line, and by the induced current flow caused by the ungrounded flow of current in the power line, or the conducted flow of fault current in the power line, reducing the induced voltage on the signaling conductor to a safe value within the insulation value of the same.

2. A system of the class described, comprising in combination an A. C. power transmitting line comprising aerial conductors insulated from ground except through a grounded neutral connection, an insulated signalling conductor paralleling the power line for a sufficient distance that when it is subjected to the inductive effect of current flow in the power line a potential will tend to be induced upon said signalling conductor in excess of the insulation value of said signalling conductor, shielding means between the power line and the signalling conductor, said shielding means being of a conductivity of the order of one of the power carrying conductors and having a plurality of highly conductive ground taps, said shielding means being adapted to carry a sufficient current flow therein in opposition to the effect of the disturbing flow of current as to limit the induced voltage on the signalling conductor to a value safely within the insulation value of the signalling conductor, due to either electro-magnetic induction of the non-grounded current flow in the power line or to the conducted flow of fault current in the case of a ground fault of one of the conductors of the transmission line.

3. A system of the class described, comprising in combination an A. C. power transmitting line comprising a plurality of insulated metallic conductors, an insulated signalling conductor paralleling the power line for a sufficient distance that when it is subjected to the inductive effect of unbalanced current flow in the power line a potential will tend to be induced upon said signalling conductor in excess of the insulation value of said signalling conductor, shielding means between the power line and the signalling conductor, said shielding means being of a conductivity of the order of one of the power carrying conductors and having a plurality of highly conductive ground taps, said shielding means being adapted to carry a sufficient current flow therein in opposition to the effect of the disturbing flow of current as to limit the induced voltage on the signalling conductor to a value safely within the insulation value of the signalling conductor, due to either unbalanced electromagnetic induction of the non-grounded current flow in the power line or to the conducted flow of fault current in the case of a ground fault of a conductor of the power line.

4. A system of the class described for preventing the magnetic effect of an electric power transmission system from interrupting the operation of an adjacent communication system, which comprises the combination of an A. C. power transmitting line, said line comprising a plurality of insulated metallic power carrying conductors, an insulated signalling conductor adjacent the power line, said signalling conductor being insulated for relatively low voltage only and adapted to employ currents of a relatively low magnitude, said signalling conductor extending along the power line for a distance great enough that the residual unneutralized magnetic field of the flow of current in the power line due to either normal or abnormal current flow in said power carrying conductors may induce an excessive potential in said signalling conductor, tending to exceed either the insulating value of the signalling conductor or to cause therein abnormally large current flows, and shielding means between the power line and the signalling conductor, said shielding means comprising a closed loop of sufficient extent and of a conductivity sufficient that the current flow induced therein by the aforesaid unneutralized magnetic effect will set up a magnetic field in opposition to the inducing field, thereby limiting the voltage induced upon the signalling conductor to a value which will not endanger the operation of the communication system.

In witness whereof, I hereunto subscribe my name this 13th day of February, 1928.

ALFRED HERZ.

CERTIFICATE OF CORRECTION.

Patent No. 1,782,875.            Granted November 25, 1930, to

ALFRED HERZ.

It is hereby certified that error appears in the printed specification of the above numbered patent requiring correction as follows: Page 3, line 102, claim 1, strike out the word "interposed"; and that the said Letters Patent should be read with this correction therein that the same may conform to the record of the case in the Patent Office.

Signed and sealed this 6th day of January, A. D. 1931.

(Seal)

M. J. Moore,
Acting Commissioner of Patents.